(12) United States Patent

Watson et al.

(10) Patent No.: US 12,646,395 B2

(45) Date of Patent: Jun. 2, 2026

(54) ARTICLE OF PERSONAL PROTECTIVE EQUIPMENT AND SYSTEM

(71) Applicant: 3M INNOVATIVE PROPERTIES COMPANY, St. Paul, MN (US)

(72) Inventors: Benjamin W. Watson, Odiham (GB); David J. Crouch, South Yorkshire (GB); Mohammed Saleem, Reading (GB); Bradley D. Murray, White Bear Lake, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 8 days.

(21) Appl. No.: 18/716,282

(22) PCT Filed: Dec. 2, 2022

(86) PCT No.: PCT/IB2022/061706

§ 371 (c)(1),
(2) Date: Jun. 4, 2024

(87) PCT Pub. No.: WO2023/105370

PCT Pub. Date: Jun. 15, 2023

(65) Prior Publication Data

US 2025/0037562 A1     Jan. 30, 2025

Related U.S. Application Data

(60) Provisional application No. 63/265,070, filed on Dec. 7, 2021.

(51) Int. Cl.
G08B 21/02 (2006.01)
G08B 7/06 (2006.01)
(Continued)

(52) U.S. Cl.
CPC .............. G08B 21/02 (2013.01); G08B 7/06 (2013.01); H04L 51/224 (2022.05); H04L 67/12 (2013.01)

(58) Field of Classification Search
CPC ........ G08B 21/02; G08B 7/06; G08B 25/009; G08B 21/12; H04L 51/224; H04L 67/12;
(Continued)

(56) References Cited

U.S. PATENT DOCUMENTS

| | | | |
|---|---|---|---|
| 4,169,463 | A | 10/1979 | Piquard |
| 10,485,473 | B2 | 11/2019 | Bonifas et al. |
| 10,918,291 | B2 | 2/2021 | Rinderknecht et al. |
| 2012/0310115 | A1* | 12/2012 | Bedingham .............. A61B 7/04 |
| | | | 600/586 |

(Continued)

FOREIGN PATENT DOCUMENTS

| | | | |
|---|---|---|---|
| EP | 2563213 | B1 | 1/2016 |
| EP | 3513732 | A1 | 7/2019 |

(Continued)

OTHER PUBLICATIONS

International Search Report for PCT International Application No. PCT/IB2022/061706, mailed on Mar. 9, 2023, 3 pages.

*Primary Examiner* — Quan Zhen Wang
*Assistant Examiner* — Rajsheed O Black-Childress
(74) *Attorney, Agent, or Firm* — Katherine M. Scholz

(57) ABSTRACT

The present disclosure provides an article of personal protective equipment (PPE) associated with a worker. The article of PPE includes at least one sensor configured to generate signals indicative of a sensed variable related to at least one of the worker and the work environment. The article of PPE further includes a processor communicably coupled to the at least one sensor and at least one other article of PPE associated with one other worker. The processor is configured to receive the signals from the at least one sensor. The processor is further configured to determine one or more messages corresponding to the signals. The (Continued)

processor is further configured to transmit the one or more messages directly to the at least one other article of PPE based on at least one of a push communication protocol, a pull communication protocol, and a continuous communication protocol.

16 Claims, 8 Drawing Sheets

(51) Int. Cl.
H04L 51/224 (2022.01)
H04L 67/12 (2022.01)

(58) Field of Classification Search
CPC ... H04W 4/70; A62B 7/02; A62B 9/00; A62B 18/02
See application file for complete search history.

(56) References Cited

U.S. PATENT DOCUMENTS

| | | | |
|---|---|---|---|
| 2017/0330437 A1* | 11/2017 | Hatanaka | A41D 13/1281 |
| 2019/0008973 A1 | 1/2019 | Eldor | |
| 2019/0080565 A1 | 3/2019 | Lee | |
| 2019/0321583 A1 | 10/2019 | Poltorak | |
| 2020/0082699 A1 | 3/2020 | Jati et al. | |
| 2020/0118413 A1 | 4/2020 | Kanukurthy et al. | |
| 2021/0306797 A1 | 9/2021 | Johnson et al. | |
| 2021/0326128 A1* | 10/2021 | Malladi | H04L 12/40006 |

FOREIGN PATENT DOCUMENTS

| | | |
|---|---|---|
| EP | 3528697 B1 | 8/2023 |
| EP | 2793692 B1 | 11/2023 |
| WO | 2003074471 A1 | 9/2003 |
| WO | 2015006829 A1 | 1/2015 |
| WO | 2019202126 A1 | 10/2019 |

* cited by examiner

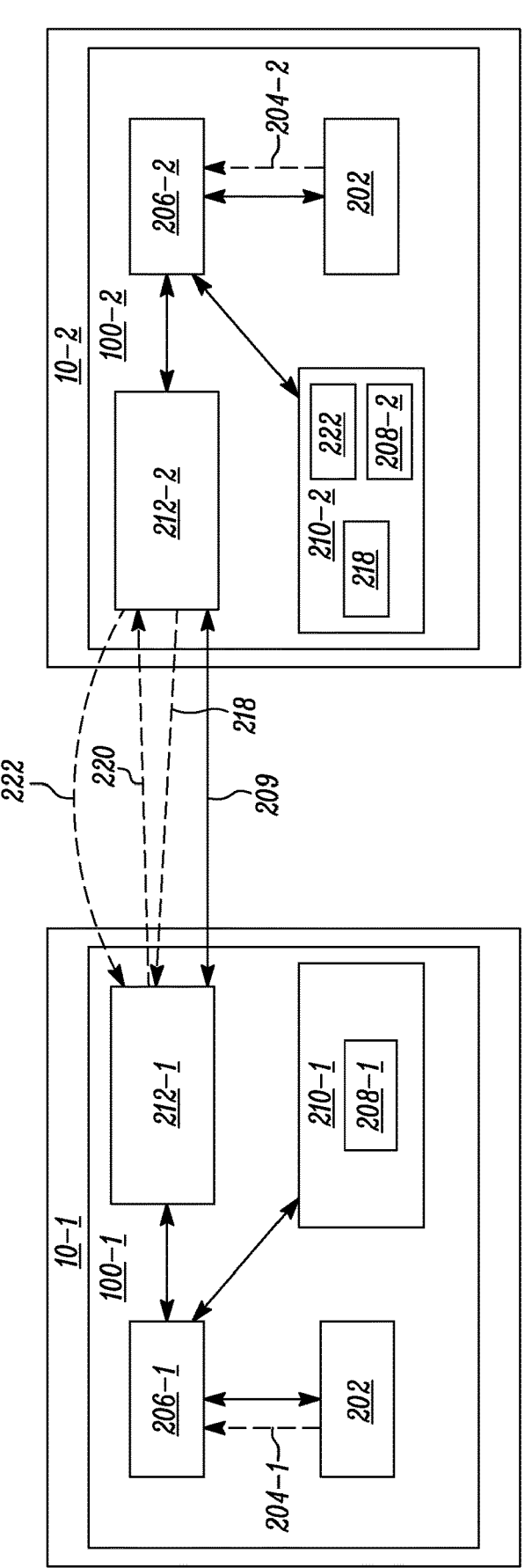
*FIG. 7*

ARTICLE OF PERSONAL PROTECTIVE EQUIPMENT AND SYSTEM

TECHNICAL FIELD

The present disclosure relates generally to an article of personal protective equipment (PPE). More particularly, the present disclosure relates to an article of PPE associated with a worker in a work environment, and a PPE system including a plurality of articles of PPE associated with corresponding workers in a work environment.

BACKGROUND

Maintaining the safety and health of team members or workers is a major concern across many industries. The workers must adhere to certain requirements and rules to ensure proper administration of health and safety procedures. If a worker is going to enter or remain in a work environment having hazardous or potentially hazardous conditions, the worker may be required to wear or carry an article of personal protective equipment (PPE). In some cases, wearing the article of PPE alone may not be enough to ensure safety of a worker in a given hazardous work environment. Sometimes, a worker may not recognize an impending safety event until the work environment becomes too dangerous or the worker's health deteriorates too far. In some cases, a worker may want to communicate to another team member to share an emergency update which may be difficult in hazardous work environments.

SUMMARY

In a first aspect, the present disclosure provides an article of personal protective equipment (PPE) associated with a worker present in a work environment. The article of PPE includes at least one sensor configured to generate signals indicative of a sensed variable related to at least one of the worker and the work environment. The article of PPE further includes a processor communicably coupled to the at least one sensor and at least one other article of PPE associated with one other worker. The processor is configured to receive the signals from the at least one sensor. The processor is further configured to determine one or more messages corresponding to the signals. The processor is further configured to transmit the one or more messages directly to the at least one other article of PPE based on at least one of a push communication protocol, a pull communication protocol, and a continuous communication protocol.

In a second aspect, the present disclosure provides a personal protective equipment (PPE) system. The PPE system includes a plurality of articles of PPE associated with corresponding workers present in a work environment. At least one article of PPE from the plurality of articles of PPE includes at least one sensor configured to generate signals indicative of a sensed variable related to at least one of the corresponding worker and the work environment. The at least one article of PPE further includes a processor communicably coupled to the at least one sensor and to at least one other article of PPE from the plurality of articles of PPE. The processor is configured to receive the signals from the at least one sensor. The processor is further configured to determine one or more messages corresponding to the signals. The processor is further configured to transmit the one or more messages directly to the at least one other article of PPE based on at least one of a push communication protocol, a pull communication protocol, and a continuous communication protocol.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

FIG. 7 is a schematic block diagram of the PPE system of FIG. 3, according to another embodiment of the present disclosure.

DETAILED DESCRIPTION

Figure 1:
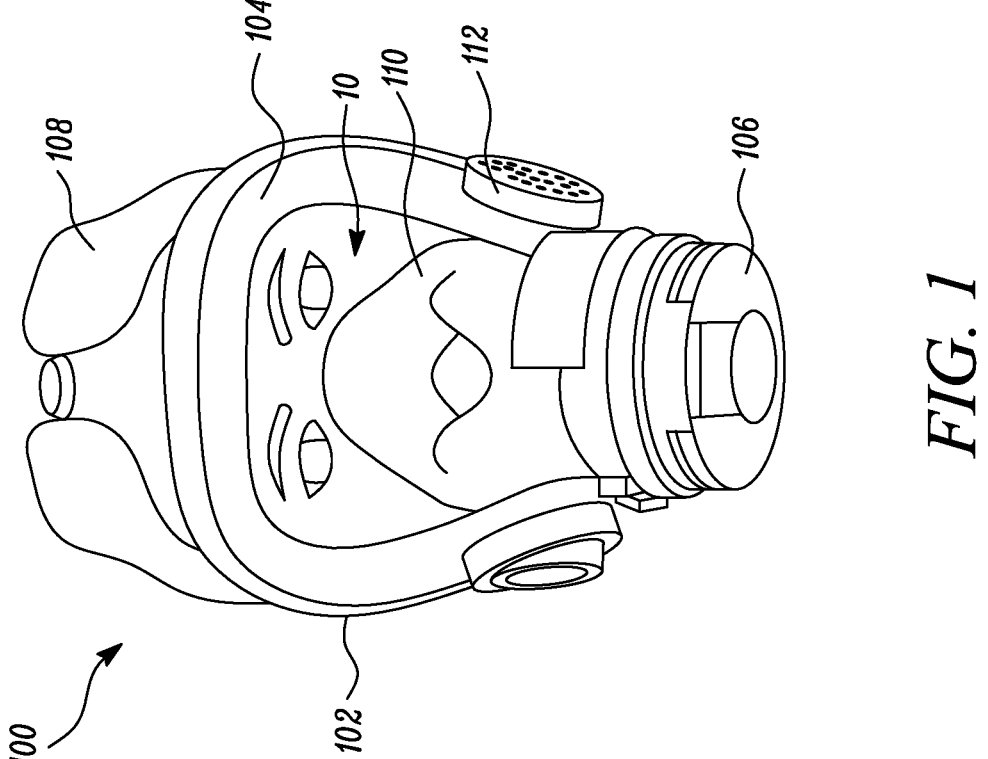
FIG. 1 is a front perspective view of an exemplary article of personal protective equipment (PPE), according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "about", unless otherwise specifically defined, means to a high degree of approximation (e.g., within +/−5% for quantifiable properties) but again without requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B".

As used herein, the term "hazardous or potentially hazardous environmental conditions" may refer to environmental conditions that may be harmful to a human being, such as high noise levels, high ambient temperatures, lack of oxygen, presence of explosives, exposure to radioactive or biologically harmful materials, and exposure to other hazardous substances. Depending upon the type of safety equipment, environmental conditions and physiological conditions, corresponding thresholds or levels may be established to help define hazardous and potentially hazardous environmental conditions.

As used herein, the term "hazardous or potentially hazardous environments" may refer to environments that include hazardous or potentially hazardous environmental conditions. The hazardous or potentially hazardous environments may include, for example, chemical environments, biological environments, nuclear environments, fires, industrial sites, construction sites, agricultural sites, mining sites, or manufacturing sites.

As used herein, the term "an article of personal protective equipment (PPE)" may include any type of equipment or clothing that may be used to protect a user from hazardous or potentially hazardous environmental conditions. In some examples, one or more individuals, such as the users, may utilize the article of PPE while engaging in tasks or activities within the hazardous or potentially hazardous environment. Examples of the articles of PPE may include, but are not limited to, hearing protection (including ear plugs and ear muffs), respiratory protection equipment (including disposable respirators, reusable respirators, powered air purifying respirators, self-contained breathing apparatus and supplied air respirators), facemasks, oxygen tanks, air bottles, protective eyewear, such as visors, goggles, filters or shields (any of which may include augmented reality functionality), protective headwear, such as hard hats, hoods or helmets, protective shoes, protective gloves, other protective clothing, such as coveralls, aprons, coat, vest, suits, boots and/or gloves, protective articles, such as sensors, safety tools, detectors, global positioning devices, mining cap lamps, fall protection harnesses, exoskeletons, self-retracting lifelines, heating and cooling systems, gas detectors, and any other suitable gear configured to protect the users from injury. The articles of PPE may also include any other type of clothing or device/equipment that may be worn or used by the users to protect against extreme noise levels, extreme temperatures, fire, reduced oxygen levels, explosions, reduced atmospheric pressure, radioactive, and/or 20) biologically harmful materials.

As used herein, the term "communicably coupled to" refers to direct coupling between components and/or indirect coupling between components via one or more intervening components. Such components and intervening components may comprise, but are not limited to, junctions, communication paths, components, circuit elements, circuits, functional blocks, and/or devices. As an example of indirect coupling, a signal conveyed from a first component to a second component may be modified by one or more intervening components by modifying the form, nature, or format of information in a signal, while one or more elements of the information in the signal are nevertheless conveyed in a manner than can be recognized by the second component.

As used herein, the term "communication channel" may refer to a path, a conduit, a logical channel, or any means of communication that enables or supports a communication interaction or an exchange of information between two or more devices or parties. The communication channel may be wired or wireless.

As used herein, the term "signal," includes, but is not limited to, one or more electrical signals, optical signals, electromagnetic signals, analog and/or digital signals, one or more computer instructions, a bit and/or bit stream, or the like.

As used herein, the term "continuous communication protocol" may refer to a setting in which a processing unit of a first device can "continuously transmit" information to a second device.

As used herein, the term "pull communication protocol" may refer to a setting in which a processing unit of a first device can transmit information to a second device upon receiving a request for the information from the second device.

As used herein, the term "push communication protocol" may refer to a setting in which a processing unit of a first device can "push or transmit" information to a second device upon occurrence of a particular event.

The present disclosure relates to an article of personal protective equipment associated with a worker in a work environment, and a PPE system including a plurality of articles of PPE associated with corresponding workers present in a work environment. The PPE system may be incorporated in many industries and operations that involve use of the plurality of articles of PPE, such as respirators, self-contained breathing apparatus (SCBA), hearing protection devices, protective shoes, protective gloves, protective headwear, goggles, shields, and the like.

In some applications, for a team of workers operating in a hazardous work environment, it may be a cumbersome task to determine a condition of a worker or a team member through normal and conventional techniques of communication. Conventional workplace communication systems provide limited opportunities for quickly and efficiently sharing the information to and from a worker present in a work environment. For example, to determine a health status and the condition of the worker, the worker may have to remove an article of PPE such that the required sensors and instruments can be used. Removal of the article of PPE for determining the health status of the worker is a time-consuming process and may also be dangerous within or in close proximity of a hazardous work environment.

Moreover, to determine the health status of the worker, various monitoring devices (e.g., pulse oximeter, blood pressure monitor, glucose monitor, heart rate monitor, and so on) may have to be used on the worker. Using such monitoring devices may again be time consuming and this may delay a medical treatment of the worker whose safety could already be at risk. Therefore, the conventional techniques of communication with the worker may create an additional risk for the worker. Further, in some cases, the worker may need to immediately communicate with another team member for sharing an emergency or critical event that has put the worker at risk. For example, the worker may want to inform the team member or his group about hemodynamic status, an injury, a slightly unconscious feeling, a safety event in one or more locations, a fault in the article of PPE, an early warning sign, an increased temperature, a fatigue level, and so on. In some cases, the worker may need to immediately communicate with another team member for sharing an update which could be important for the team member. It may be difficult to have a continuous transmission of information among the various workers using the conventional techniques of communication.

In some cases, the worker may be exposed to a dangerous situation and unable to communicate with the team members. In some cases, the worker may become unconscious and therefore, cannot contact the team members to inform his/her condition and ask for immediate medical support. In some cases, the worker may experience a sudden fall and none of the team members would be aware of such an incident. Using the conventional techniques of communication, the worker may be unable to quickly alert a co-worker for an upcoming hazard associated with a work environment of the co-worker. Therefore, for a task involving a team of workers wearing their corresponding articles of PPE, the conventional communication methods may increase a response time for a worker to interact with a co-worker, reduce a productivity of one or more workers, and adversely impact an overall performance of the team.

The present disclosure provides a personal protective equipment (PPE) system. The PPE system includes a plurality of articles of PPE associated with corresponding workers present in a work environment. At least one article of PPE from the plurality of articles of PPE includes at least one sensor configured to generate signals indicative of a sensed variable related to at least one of the corresponding worker and the work environment. The at least one article of PPE further includes a processor communicably coupled to the at least one sensor and to at least one other article of PPE from the plurality of articles of PPE. The processor is configured to receive the signals from the at least one sensor. The processor is further configured to determine one or more messages corresponding to the signals. The processor is further configured to transmit the one or more messages directly to the at least one other article of PPE based on at least one of a push communication protocol, a pull communication protocol, and a continuous communication protocol.

As the processor of the at least one article of PPE of the worker is communicably coupled to the at least one other article of PPE of one other worker, the worker can directly communicate with the one other worker. In other words, any relevant information in the one or more messages can be directly transmitted from the worker to the one other worker. Based on the continuous communication protocol, the one or more messages are continuously transmitted directly from the worker to the one other worker.

In the PPE system, the signals generated by the at least one sensor and the direct transmission of the one or more messages to the one other worker may enable the one other worker may quickly determine the condition of the worker and the associated work environment. Further, the PPE system do not involve removal of the at least one article of PPE for determining and transmitting any information related to the worker and the associated work environment, and may therefore provide a time saving communication process between the worker and the one other worker. Moreover, while determining and transmitting the one or more messages in the disclosed PPE system, there is a minimal possibility of an occurrence of a dangerous event that could otherwise happen upon removal of the at least one article of PPE to determine the condition of the worker. Therefore, the PPE system including the processor in the at least one article of PPE of the worker may provide an efficient and a quick method of communication between the worker and the one other worker.

In some cases, upon receiving the one or more messages indicative of at least one of an abnormal hemodynamic health status of the worker, an abnormal physiological data of the worker, an accident in close proximity of the worker, an unconscious state of the worker, an injury sustained by the worker, or an alert indicative of an environmental hazard in close proximity to the worker, the one other worker may take any preventive measures or share the one or more messages with other team members or a concerned medical professional to protect and/or alert the worker. For example, the worker may be unaware of a poor air quality of the work environment and an upcoming hazardous event due to poor air quality. In such a case, the one other worker receives a message indicative of poor air quality of the work environment of the worker and the one other worker may take preventive measures to protect and/or alert the worker from contaminated air.

In some cases, the one or more messages received by the at least one other article of PPE of the one other worker may contain information that is important for safety of the one other worker. In an example, work environments of the worker and the one other worker may be in close proximity to each other. In case of an accident and/or an environmental hazard in the work environment of the worker, the other worker may receive an early update about such accidents/events that may otherwise later put the nearby other worker in a difficult and risky situation.

Based on the pull communication protocol, the processor is configured to transmit the one or more messages directly from the worker to the one other worker upon receiving a request from the at least one other article of PPE. In other words, based on the pull communication protocol, there is an on-demand transmission of the one or more messages from the at least one article of PPE to the at least one other article of PPE associated with the one other worker. In some cases, the processor of the at least one article of PPE receives a request for information which may be important for the safety of the one other worker. In some cases, the processor of the at least one article of PPE receives a request for information which may be important for the safety of the worker. In some cases, the one other worker may need information related to the work environment of the worker. In an example, the processor of the at least one article of PPE receives a request for information indicative of harmful substances and radiation in the work environment. In some cases, the one other worker may need details of one or more physiological parameters of the worker wearing the at least one article of PPE. Therefore, based on the pull communication protocol, the one other worker can demand or request a desirable information related to the worker. The one other worker may take preventive measures to protect himself/herself and the worker in case of an emergency.

Based on the push communication protocol, the processor of the at least one article of PPE is configured to transmit critical data (related to a critical event associated with the worker) directly to the at least one other article of PPE associated with the one other worker. In some cases, where the worker is exposed to a dangerous condition, the processor of the at least one article of PPE transmits the critical data indicative of the dangerous condition to the one other worker. In some cases, where the worker may be rendered unconscious and cannot contact the team members to inform about his/her condition, the processor of the at least one article of PPE transmits the critical data indicative of the unconscious condition of the worker to the one other worker. Therefore, based on the push communication protocol, the processor of the at least one article of PPE transmits information indicative of an emergency event or a critical condition to the one other worker.

Hence, based on various communication protocols (i.e., the continuous communication protocol, the pull communication protocol, and the push communication protocol), the one or more messages are transmitted directly from the at least one article of PPE to the at least one other article of PPE. Through the one or more messages and critical data transmitted to the one other worker, the one other worker may take any preventive measures and action to tackle an impending safety event that could have otherwise put the worker and/or the one other worker at risk. Therefore, for a task involving a team of workers wearing their corresponding articles of PPE, the PPE system including the processor may decrease a response time for a worker to interact with a co-worker, increase a productivity of one or more workers, and improve an overall performance of the team.

Referring now to Figures, FIG. 1 illustrates a perspective view of an article of personal protective equipment (PPE) 100 associated with a worker 10 present in a work environment, in accordance with an embodiment of the present disclosure. In some embodiments, the article of PPE 100 includes one of a respiratory protective equipment (RPE), a self-contained breathing apparatus (SCBA), a powered air purifying respirator (PAPR), a supplied air respirator (SAR), a pressure-demand supplied air respirator (PDSAR), a face shield, a safety goggle, and a hearing aid. In the illustrated embodiment of FIG. 1, the article of PPE 100 is a full-face air-purifying respirator.

The article of PPE 100 includes a mask 102 holding a lens 104 and an air purifying cartridge 106. The mask 102 is adapted to be secured to a face of a worker 10 by a head harness 108. The article of PPE 100 provides breathing gas to the worker 10 and/or filters breathing air for the worker 10, which includes air which has been filtered or otherwise treated so that airborne contaminants are removed therefrom. While the mask 102 described in connection with the illustrated embodiment is constructed for attachment of the air purifying cartridge 106 to serve as a respirator, it should be understood that the mask 102 may alternatively be constructed for attachment of hoses for delivering oxygen or other breathable gas, as well as adapters to accept hoses, filters and/or regulators specific to particular functions or to be used in particular environments.

The mask 102 covers the eyes, nose and mouth of the worker 10 for protecting the worker 10 from airborne contaminants by means of the air purifying cartridge 106. While the mask 102 is shown to have one air purifying cartridge 106 centrally located in front of the worker's mouth, it should be understood that the mask 102 can be provided with any number of cartridges 106 and the cartridges 106 may be positioned at any suitable location. Various types of cartridges 106 (some containing gas absorbents and others containing mechanical filters and others containing both) may be interchangeably attached to the mask 102. Further, the mask 102 is fitted for a particular use with the type of cartridge 106 that is suitable for removing the particular contaminants in the environment at the time of use. The article of PPE 100 also includes one or more exhalation valves 112 provided on the sides or at the front of the mask 102.

The article of PPE 100 further includes a nose cup 110 surrounding the worker's mouth and nose. The nose cup 110 is positioned behind the lens 104. To deliver air to the worker 10, a flow path (not shown) is defined between the cartridge 106 and the nose cup 110. In some embodiments, the nose cup 110 is coupled to the lens 104. In some other embodiments, the nose cup 110 is coupled to the mask 102. In some embodiments, the article of PPE 100 does not include the nose cup 110.

In some embodiments, the article of PPE 100 may be used for any of a number of applications, such as SCBA applications, air purification respirator (APR) applications, powered air purification respirator (PAPR) applications, and the like. In some embodiments, the mask 102 may be used by the worker 10 for different applications by interchanging the components attached to the mask 102 for delivering or expelling air. For example, by changing the type of cartridge 106, or by attaching a hose to the mask 102, the worker 10 may be able to use the article of PPE 100 in a different environment.

Figure 2:
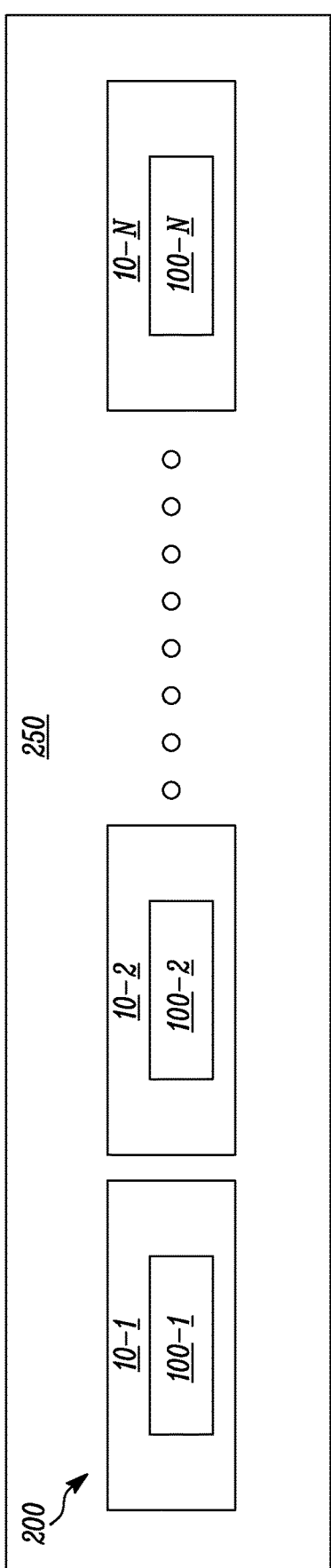
FIG. 2 is a schematic block diagram of a PPE system including a plurality of articles of PPE of FIG. 1, according to an embodiment of the present disclosure.

FIG. 2 illustrates a schematic block diagram of a PPE system 200, in accordance with an embodiment of the present disclosure. The PPE system 200 includes a plurality of articles of PPE 100-1, 100-2 . . . 100-N (collectively referred to as "articles of PPE 100") associated with corresponding workers 10-1, 10-2 . . . 10-N (collectively referred to as "workers 10") present in a work environment, for example, a work environment 250 schematically shown in FIG. 2. In some embodiments, the article of PPE 100-1 can be interchangeably referred to herein as "a first article of PPE 100-1". In some embodiments, the article of PPE 100-2 can be interchangeably referred to herein as "a second article of PPE 100-2". In some embodiments, the worker 10-1 can be interchangeably referred to herein as "a first worker 10-1". In some embodiments, the worker 10-2 can be interchangeably referred to herein as "a second worker 10-2". In some embodiments, at least one article of PPE from the plurality of articles of PPE 100-1, 100-2 . . . 100-N includes one of a RPE, a SCBA, a PAPR, a SAR, a PDSAR, a face shield, a safety goggle, and a hearing aid.

Figure 3:
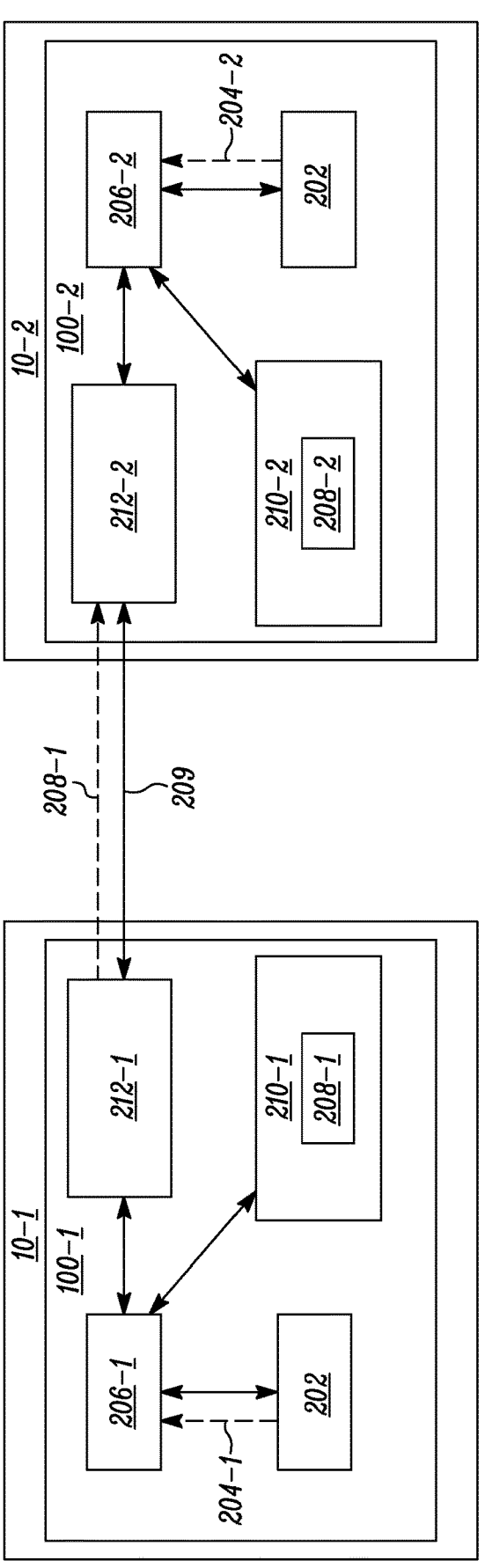
FIG. 3 is a schematic block diagram of the PPE system of FIG. 2 illustrating in detail a first article of PPE and a second article of PPE from the plurality of articles of PPE, with some articles of PPE not shown, according to an embodiment of the present disclosure.
Figure 3:

FIG. 3 is a schematic block diagram of the PPE system 200 illustrating in detail the first article of PPE 100-1 and the second article of PPE 100-2, in accordance with an embodiment of the present disclosure. The articles of PPE other than the first article of PPE 100-1 and the second article of PPE 100-2 are not shown in FIG. 3 for clarity purposes. Referring to FIGS. 2 and 3, at least one article of PPE from the plurality of articles of PPE 100-1, 100-2 . . . 100-N includes at least one sensor 202. In some embodiments, the at least one article of PPE includes the first article of PPE 100-1. In the illustrated embodiment of FIG. 3, the at least one article of PPE includes both the first article of PPE 100-1 and the second article of PPE 100-2. In other embodiments, in addition to the first article of PPE 100-1 and the second article of PPE 100-2, the at least one article of PPE may also include other articles of PPE from the plurality of articles of PPE 100-1, 100-2 . . . 100-N.

The at least one sensor 202 is configured to generate signals indicative of a sensed variable related to at least one of the corresponding worker and the work environment (e.g., the work environment 250 schematically shown in FIG. 2). In the illustrated embodiment of FIG. 3, the at least one sensor 202 of the first article of PPE 100-1 is configured to generate first signals 204-1 indicative of a sensed variable related to at least one of the first worker 10-1 and his/her work environment. Further, in the illustrated embodiment of FIG. 3, the at least one sensor 202 of the second article of PPE 100-2 is configured to generate second signals 204-2 indicative of a sensed variable related to at least one of the second worker 10-2 and his/her work environment. In some examples, the sensed variable may include temperature levels, pressure levels, physiological parameters, heart rate, concentration of harmful gases/chemicals/hazardous substances, wind speed, wind direction, locations of the first article of PPE 100-1 and the second article of PPE 100-2 with respect to each other, a distance between the first article of PPE 100-1 and the second article of PPE 100-2, etc.

In some embodiments, the at least one sensor 202 includes at least one of a physiological sensor, a thermal imaging camera, a video camera, a gas detector, a temperature sensor, a humidity sensor, an accelerometer, a magnetometer, an altimeter, an environmental sensor, and a sighting device. In an example, during firefighting operations, thermal imaging camera technology can be used to locate a source of a fire, find victims, and optimize the process of searching for fire extension in the void spaces within structural walls. In an example, during firefighting operations, the video camera can be used to record a video feed and capture pictures of an area in vicinity of the wearer 10, or other firefighters or persons which may be trapped due to fire. In some cases where the at least one sensor 202 is a thermal imaging camera, the respective output units of the first article of PPE 100-1 and the second article of PPE 100-2 may provide a wider field of view captured by the thermal imaging camera.

In some embodiments, the at least one sensor 202 may include gas dosimeters. Gas dosimeters can be used to monitor exposure of the first worker 10-1 and the second worker 10-2 to toxic industrial chemicals and radiations. In some embodiments, the at least one sensor 202 may include heat flux measurement gauges. In an example, during firefighting operations, the heat flux measurement gauge can be used to monitor potential flashover conditions by measuring the temperature in an upper layer of air. Typical flashover heat fluxes are in the 10 kW/m$^2$ to 20 kW/m$^2$ range, which is associated with an upper layer temperature of around 600° C. By monitoring the upper layer heat flux, it may be possible to predict impending flashover conditions. In some embodiments, the at least one sensor 202 may include a personal alert safety system (PASS). In an example, during firefighting operations, the PASS can be used to detect a firefighter's motion in a work environment of the firefighter. In some embodiments, the at least one sensor 202 may include other sensing devices, such as pressure sensors, temperature sensors, etc.

Referring to FIGS. 2 and 3, at least one article of PPE from the plurality of articles of PPE 100-1, 100-2 . . . 100-N includes a processor communicably coupled to the at least one sensor 202 and at least one other article of PPE from the plurality of articles of PPE 100-1, 100-2 . . . 100-N. In the illustrated embodiment of FIG. 3, the at least one article of PPE includes the first article of PPE 100-1 and the at least one other article of PPE includes the second article of PPE 100-2.

In some embodiments, the at least one article of PPE can be interchangeably referred to herein as "the first article of PPE 100-1". In some embodiments, the at least one other article of PPE can be interchangeably referred to herein as "the second article of PPE 100-2". The second worker 10-2 can be interchangeably referred to herein as "the at least one other worker". Therefore, the first article of PPE 100-1 includes a first processor 206-1 communicably coupled to the at least one sensor 202 (associated with the first article of PPE 100-1) and the second article of PPE 100-2 of the second worker 10-2 (i.e., the one other worker). Further, the second article of PPE 100-2 includes a second processor 206-2 communicably coupled to the at least one sensor 202 (associated with the second article of PPE 100-2) and the first article of PPE 100-1 of the first worker 10-1.

In an application, each of the first processor 206-1 and the second processor 206-2 may be a controller, a control circuit, a computer, a microprocessor, a microcomputer, a central processing unit, or any suitable device or apparatus. Each of the first processor 206-1 and the second processor 206-2 may comprise one or more of a digital processor, an analog processor, a digital circuit designed to process information, an analog circuit designed to process information, a state machine, and/or other mechanisms for electronically processing information. In some embodiments, the first processor 206-1 is communicably coupled to the second article of PPE 100-2 via at least one of a wired connection and a wireless connection. The first processor 206-1 may be communicably coupled to the at least one sensor 202 of the first article of PPE 100-1 via at least one of a wired connection and a wireless connection. The second processor 206-2 may be communicably coupled to the at least one sensor 202 of the second article of PPE 100-2 via at least one of a wired connection and a wireless connection.

The first processor 206-1 is configured to receive the first signals 204-1 from the at least one sensor 202 of the first article of PPE 100-1. The first processor 206-1 is further configured to determine one or more first messages 208-1 corresponding to the first signals 204-1. After determining the one or more first messages 208-1, the first processor 206-1 may store the one or more first messages 208-1 in a first memory 210-1 of the first article of PPE 100-1. Similarly, the second processor 206-2 is configured to receive the second signals 204-2 from the at least one sensor 202 of the second article of PPE 100-2. The second processor 206-2 is further configured to determine one or more second messages 208-2 corresponding to the second signals 204-2. After determining the one or more second messages 208-2, the second processor 206-2 may store the one or more second messages 208-2 in a second memory 210-2 of the second article of PPE 100-2.

Each of the first memory 210-1 and the second memory 210-2 may include a computer-readable storage medium or computer-readable storage device. In some examples, each of the first memory 210-1 and the second memory 210-2 may include one or more of a short-term memory or a long-term memory. Each of the first memory 210-1 and the second memory 210-2 may include, for example, a random-access memory (RAM), a dynamic random-access memory (DRAM), a static random-access memory (SRAM), a magnetic hard disc, an optical disc, a flash memory, or a form of electrically programmable memory (EPROM) or electrically erasable and programmable memory (EEPROM).

With continued reference to FIG. 3, upon determining the one or more first messages 208-1, the first processor 206-1 is further configured to transmit the one or more first messages 208-1 directly to the second article of PPE 100-2 through a first communication unit 212-1 of the first article of PPE 100-1. Specifically, the first processor 206-1 is communicably coupled to the first communication unit 212-1 which is further configured to transmit the one or more first messages 208-1 to the second article of PPE 100-2.

Upon determining the one or more second messages 208-2, the second processor 206-2 is further configured to transmit the one or more second messages 208-2 directly to the first article of PPE 100-1 through a second communication unit 212-2 of the second article of PPE 100-2. The second processor 206-2 is communicably coupled to the second communication unit 212-2 which is further configured to transmit the one or more second messages 208-2 to the first article of PPE 100-1.

Once the one or more first messages 208-1 are transmitted directly from the first article of PPE 100-1 to the second article of PPE 100-2, the second processor 206-2 may output the one or more first messages 208-1 to the second worker 10-2 through an output unit (not shown) of the second article of PPE 100-2. Once the one or more second messages 208-2 are transmitted directly from the second article of PPE 100-2 to the first article of PPE 100-1, the first processor 206-1 may output the one or more second messages 208-2 to the first worker 10-1 through an output unit (not shown) of the first article of PPE 100-1. The output units of the first article of PPE 100-1 and the second article of PPE 100-2 may include a speaker, a display, a light emitting diode (LED), or any other type of device for generating tactile, vibrations, audio, and/or visual output.

The first communication unit 212-1 and the second communication unit 212-2 may be any devices capable of communicating wirelessly (or by wired connection) with each other. The first communication unit 212-1 may have a power source (not shown) separate from a power source (not shown) of the second communication unit 212-2. In an example, each of the first communication unit 212-1 and the second communication unit 212-2 may include a radio frequency identification (RFID) tag with a power source, a zigbee radio, a bluetooth transmitter, such as a Bluetooth beacon, a WiFi device, Adaptive network technology (ANT) node for communication in an ANT network, or any other communication device as will be apparent to one of skill in the art upon reading the present disclosure.

In the illustrated embodiment of FIG. 3, the first processor 206-1 transmits the one or more first messages 208-1 to the second article of PPE 100-2 via a communication channel 209 between the first communication unit 212-1 and the second communication unit 212-2. Specifically, the first processor 206-1 is configured to continuously transmit the one or more first messages 208-1 directly to the second article of PPE 100-2 via the communication channel 209 based on a continuous communication protocol. For the continuous communication protocol, the first communication unit 212-1 and the second communication unit 212-2 conform to a setting where the first processor 206-1 continuously transmits data to the second article of PPE 100-2. In other words, a connection corresponding to the continuous communication protocol allows the first article of PPE 100-1 to continuously transmit the one or more first messages 208-1 directly to the second article of PPE 100-2 via the communication channel 209. In other embodiments, for the continuous communication protocol, the second communication unit 212-2 and the first communication unit 212-1 conform to a setting where the second processor 206-2 continuously transmits data to the first article of PPE 100-1 via the communication channel 209.

In some cases, for the continuous communication protocol, the first processor 206-1 is configured to continuously transmit the one or more first messages 208-1 directly to the second article of PPE 100-2 based on a distance between the first article of PPE 100-1 and the second article of PPE 100-2. In an example, if the distance between the first article of PPE 100-1 and the second article of PPE 100-2 is equal to or less than a predefined distance, the first processor 206-1 may continuously transmit the one or more first messages 208-1 directly to the second article of PPE 100-2. In an example, if the distance between the first article of PPE

100-1 and the second article of PPE 100-2 is greater than the predefined distance, the first processor 206-1 may not continuously transmit the one or more first messages 208-1 directly to the second article of PPE 100-2.

In some cases, for the continuous communication protocol, the first processor 206-1 is configured to continuously transmit the one or more first messages 208-1 directly to the second article of PPE 100-2 based on a set of instructions. In an example, a passcode or a specific serial number may have to be entered to communicably connect the first processor 206-1 to the second article of PPE 100-2 via the continuous communication protocol.

In some cases, the first processor 206-1 is configured to be automatically communicably coupled to the second article of PPE 100-2 when the first article of PPE 100-1 and the second article of PPE 100-2 are in close proximity to each other for a first time.

In some embodiments, the one or more first messages 208-1 include information related to at least one of an air quality of the work environment of the first worker 10-1, a temperature of the work environment of the first worker 10-1, a pressure of the work environment of the first worker 10-1, a radiation in the work environment of the first worker 10-1, a noise level in the work environment of the first worker 10-1, a humidity of the work environment of the first worker 10-1, a concentration of harmful substances in the work environment of the first worker 10-1, a physiological data of the first worker 10-1, a hemodynamic health status of the first worker 10-1, and a physical state of the first worker 10-1. The harmful substances may include harmful solids, harmful liquids, or harmful gases. For example, the harmful substances may include radioactive or asbestos fiber concentration or respirable crystalline silica or aerosolized chemicals liquids disinfectant.

In some embodiments, the one or more second messages 208-2 include information related to at least one of an air quality of the work environment of the second worker 10-2, a temperature of the work environment of the second worker 10-2, a pressure of the work environment of the second worker 10-2, a radiation in the work environment of the second worker 10-2, a noise level in the work environment of the second worker 10-2, a humidity of the work environment of the second worker 10-2, a concentration of harmful substances in the work environment of the second worker 10-2, a physiological data of the second worker 10-2, a hemodynamic health status of the second worker 10-2, and a physical state of the second worker 10-2.

In some embodiments, the one or more first messages 208-1 and the one or more second messages 208-2 include at least one of an audio-visual signal, a haptic alert signal, a still image, a pictograph, a symbol, digital data, a slow-motion video, and a live video feed. In an example, during firefighting operations, the one or more first messages 208-1 and the one or more second messages 208-2 in the form of an audio-visual signal may be a visual warning and an audible warning. The visual warning may include a highlighted portion displayed on a display panel (not shown) of the first article of PPE 100-1 and/or on a display panel (not shown) of the second article of PPE 100-2. In some cases, the visual warning may be displayed on a heads-up display (HUD) (not shown) of the first article of PPE 100-1 and/or a HUD (not shown) of the second article of PPE 100-2.

In an example, during firefighting operations, the one or more first messages 208-1 and the one or more second messages 208-2 in the form of a still image may be a picture of an area which is subjected to maximum fire. In an example, during firefighting operations, the one or more first messages 208-1 and the one or more second messages 208-2 in the form of a still image may be a picture of one or more exit routes from an area subjected to fire. In an example, the one or more first messages 208-1 and the one or more second messages 208-2 in the form of a still image may be a heat picture of an area captured by a thermal imaging camera.

In an example, during firefighting operations, the one or more first messages 208-1 and the one or more second messages 208-2 in the form of a pictograph may consist of steps to treat a burn right away, to display a path for safe exit, etc.

In an example, the one or more first messages 208-1 and the one or more second messages 208-2 in the form of digital data may be a temperature level, a pressure level, wind speed, etc. In an example, the one or more first messages 208-1 and the one or more second messages 208-2 in the form of digital data may be explosive limits for combustible gases.

Figures 4A, 4B, 4C:
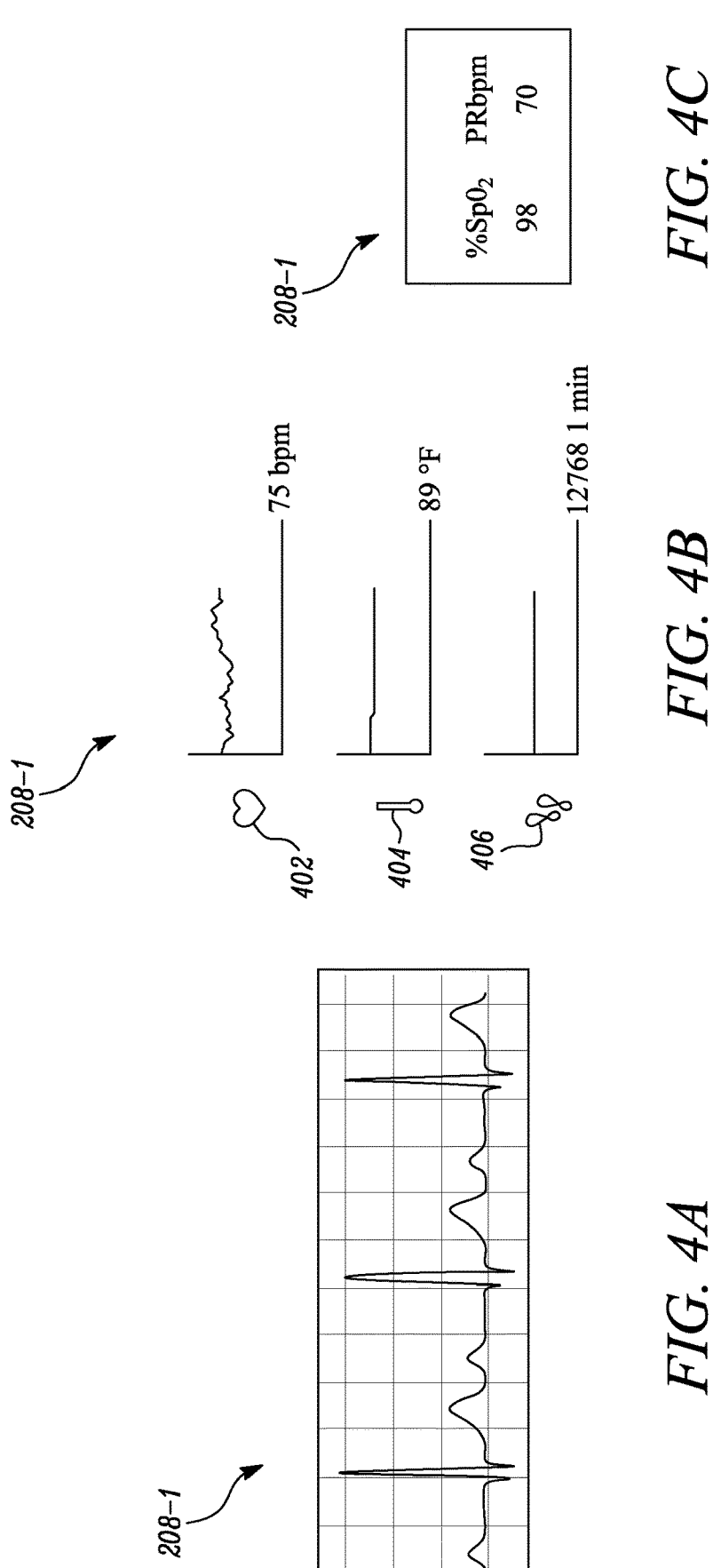
FIGS. 4A-4C illustrate exemplary messages determined by a first processor of the first article of PPE of FIG. 3.

FIG. 4A illustrates an exemplary first message 208-1 transmitted by the first processor 206-1 of the first article of PPE 100-1 to the second article of PPE 100-2. The first message 208-1 of FIG. 4A shows a graphical representation of an electrocardiogram (ECG) reading of the first worker 10-1. Through direct transmission of the first message 208-1, the second worker 10-2 can track a status of the ECG of the first worker 10-1. In some cases, the first worker 10-1 may not realize an abnormality in the ECG reading, or he/she may not be in a position to call for immediate help or communicate to other team members. In such cases, the second worker 10-2 will be able to see the abnormality in the ECG reading of the first worker 10-1 and may therefore initiate a preventive action or ask for an immediate help from a support team. The first message 208-1 showing the ECG reading of the first worker 10-1 may be displayed on the output unit of the second article of PPE 100-2.

FIG. 4B illustrates another exemplary first message 208-1 transmitted by the first processor 206-1 of the first article of PPE 100-1 to the second article of PPE 100-2. The first message 208-1 of FIG. 4B shows a continuously updated image or graph illustrating a few physiological and hemodynamic health parameters of the first worker 10-1. In this example, the first message 208-1 includes the physiological data for a heart rate 402, a temperature 404, and a step count 406 of the first worker 10-1. In this manner, the second worker 10-2 may continuously track the physiological data for the heart rate 402, the temperature 404, and the step count 406 of the first worker 10-1, and may therefore quickly recognize a risk, if any, associated with the first worker 10-1. The first message 208-1 showing the heart rate 402, the temperature 404, and the step count 406 of the first worker 10-1 may be displayed on the output unit of the second article of PPE 100-2.

FIG. 4C illustrates another exemplary first message 208-1 transmitted by the first processor 206-1 of the first article of PPE 100-1 to the second article of PPE 100-2. The first message 208-1 of FIG. 4C shows a continuously updated image illustrating blood oxygen levels and a pulse rate (heart rate) of the first worker 10-1 as the digital data. In this manner, the second worker 10-2 may continuously track the blood oxygen levels and the pulse rate of the first worker 10-1 and may therefore quickly recognize a risk, if any, associated with the first worker 10-1. The first message 208-1 showing the blood oxygen levels and the pulse rate of the first worker 10-1 may be displayed on the output unit of the second article of PPE 100-2.

Figure 5:
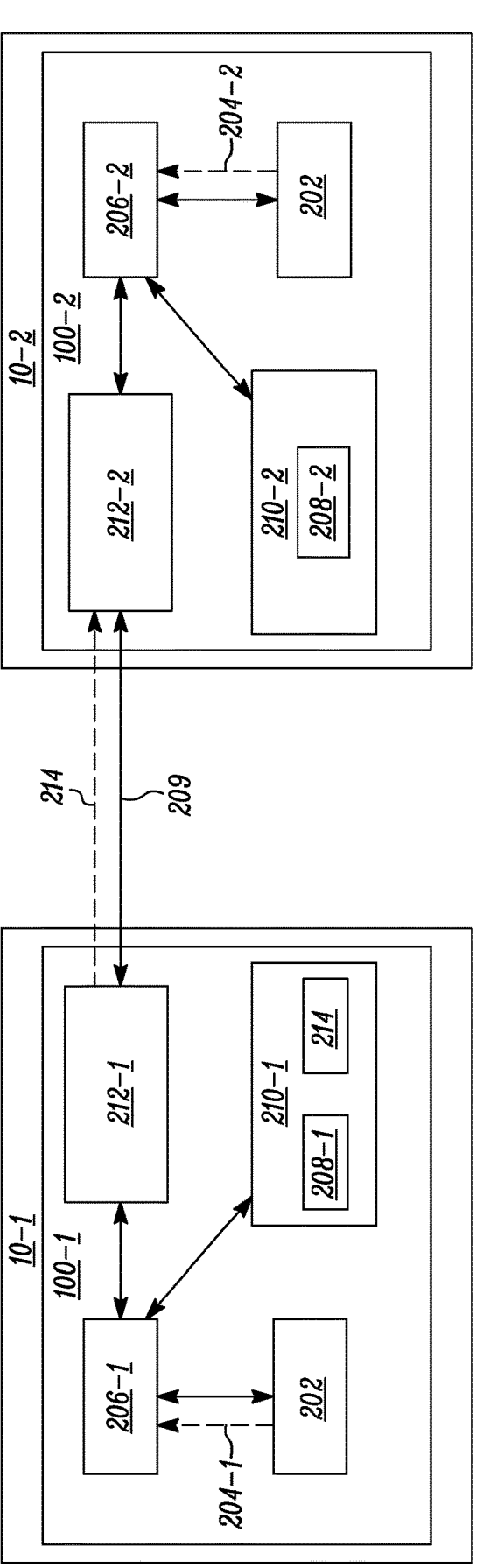
FIG. 5 is a schematic block diagram of the PPE system of FIG. 3, according to another embodiment of the present disclosure.
Figure 5:

FIG. 5 is a schematic block diagram of the PPE system 200 of FIG. 3, in accordance with another embodiment of the present disclosure. In some embodiments, the first processor 206-1 is further configured to determine a critical event based on the first signals 204-1 received from the at least one sensor 202 of the first article of PPE 100-1. In some cases, the critical event may be an event related to abnormal hemodynamic health status of the first worker 10-1, physiological abnormalities associated with the first worker 10-1, an accident in close proximity of the first worker 10-1, a sudden fall of the first worker 10-1, an environmental hazard in close proximity of the first worker 10-1, an unconscious state of the first worker 10-1, an injury sustained by the first worker 10-1, an impending safety event in close proximity of the first worker 10-1, and so on.

The first processor 206-1 is further configured to determine critical data 214 based on the critical event. In some embodiments, the critical data 214 includes information related to at least one of an abnormal hemodynamic health status of the first worker 10-1, an abnormal physiological data of the first worker 10-1, an accident in close proximity of the first worker 10-1, an unconscious state of the first worker 10-1, an injury sustained by the first worker 10-1, and an alert indicative of an environmental hazard in close proximity to the first worker 10-1. After determining the critical data 214, the first processor 206-1 may store the critical data 214 in the first memory 210-1 of the first article of PPE 100-1.

The first processor 206-1 is further configured to transmit the critical data 214 directly to the second article of PPE 100-2 via the communication channel 209 between the first communication unit 212-1 and the second communication unit 212-2. Specifically, the first processor 206-1 is configured to transmit the critical data 214 directly to the second article of PPE 100-2 based on a push communication protocol upon determining the critical event. Hence, in case of a critical event associated with the first worker 10-1 and/or his/her work environment, the first processor 206-1 transmits the critical data 214 to the second article of PPE 100-2 based on the push communication protocol. For the push communication protocol, the first communication unit 212-1 and the second communication unit 212-2 conform to a setting where the first processor 206-1 transmits critical and/or emergency data to the second article of PPE 100-2. In other words, in case of the critical event, a connection corresponding to the push communication protocol allows the first article of PPE 100-1 to transmit or push the critical data 214 directly to the second article of PPE 100-2 via the communication channel 209. In some cases, the critical data 214 is a part of the one or more first messages 208-1 determined by the first processor 206-1. In other embodiments, for transmitting critical data related to a critical event associated with the second worker 10-2 based on the push communication protocol, the second communication unit 212-2 and the first communication unit 212-1 conform to a setting where the second processor 206-2 transmits corresponding critical data to the first article of PPE 100-2 via the communication channel 209. In this manner, the second article of PPE 100-2 may push or transmit corresponding critical data directly to the first article of PPE 100-1 based on the push communication protocol.

Once the second article of PPE 100-2 of the second worker 10-2 receives the critical data 214 based on the push communication protocol, the second worker 10-2 may, if possible, take any preventive measures or share the critical data 214 with a central server, or other team members, or a concerned medical professional to protect and/or alert the first worker 10-1 from any kind of risk or an upcoming accident. In some cases, the first worker 10-1 may be unaware of a poor air quality of his/her work environment and an upcoming hazardous event due to poor air quality. In such cases, the second article of PPE 100-2 of the second worker 10-2 would receive data comprising information indicative of poor air quality of the work environment of the first worker 10-1. The second worker 10-2 may then take preventive measures to protect and/or alert the first worker 10-1 from contaminated air. In some cases, where the first worker 10-1 is exposed to a dangerous condition, the first processor 206-1 transmits the critical data 214 indicative of the dangerous condition to the second worker 10-2. In cases when the first worker 10-1 may be rendered unconscious and cannot contact the team members to inform his/her condition, the first processor 206-1 transmits the critical data 214 indicative of the unconscious condition of the first worker 10-1 to the second worker 10-2.

Figure 6:
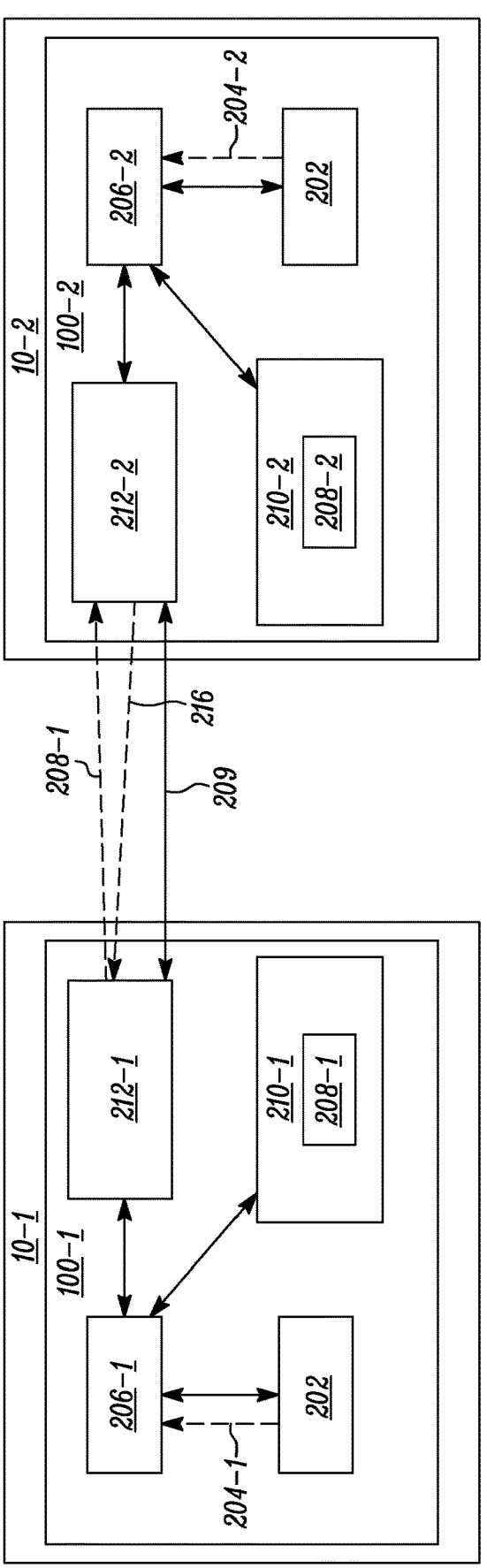
FIG. 6 is a schematic block diagram of the PPE system of FIG. 3, according to another embodiment of the present disclosure.

FIG. 6 is a schematic block diagram of the PPE system 200 of FIG. 3, in accordance with another embodiment of the present disclosure. In some embodiments, the first processor 206-1 is configured to transmit the one or more first messages 208-1 directly to the second article of PPE 100-2 based on a pull communication protocol. For the pull communication protocol, the first communication unit 212-1 and the second communication unit 212-2 conform to a setting where the first processor 206-1 transmits a given information to the second article of PPE 100-2 upon receiving a request for the given information. Therefore, based on the pull communication protocol, there is an on-demand transmission of the one or more first messages 208-1 from the first article of PPE 100-1 to the second article of PPE 100-2. In other embodiments, for the pull communication protocol, the first communication unit 212-1 and the second communication unit 212-2 conform to a setting where the second processor 206-2 transmits a given information to the first article of PPE 100-1 upon receiving a request for the given information.

In some embodiments, for the pull communication protocol, the first processor 206-1 of the first article of PPE 100-1 is configured to receive a request 216 from the second article of PPE 100-2. In other words, the second processor 206-2 of the second article of PPE 100-2 sends the request 216 to the first article of PPE 100-1. In some embodiments, the first article of PPE 100-1 receives the request 216 for transmission of information associated with the first worker 10-1 to the second article of PPE 100-2. In some embodiments, the first article of PPE 100-1 receives the request 216 for transmission of information associated with the work environment of the first worker 10-1 to the second article of PPE 100-2. In some embodiments, the first processor 206-1 receives the request 216 for transmission of the one or more first messages 208-1 to the second article of PPE 100-2. Therefore, the first processor 206-1 is further configured to transmit the one or more first messages 208-1 directly to the second article of PPE 100-2 upon receiving the request 216 from the second article of PPE 100-2. In the illustrated embodiment of FIG. 6, the first processor 206-1 transmits the one or more first messages 208-1 to the second article of PPE 100-2 via the communication channel 209 upon receiving the request 216 from the second article of PPE 100-2. In other words, it can be said that the second article of PPE 100-2 is effectively "pulling" down the one or more first messages 208-1 from the first article of PPE 100-1.

In some cases, the first processor 206-1 receives the request 216 for information which may be important for the safety of the second worker 10-2. In some cases, the first processor 206-1 receives the request 216 for information which may be important for the safety of the first worker

10-1. In some cases, the second worker 10-2 may need information related to the work environment of the first worker 10-1. In an example, the first processor 206-1 may receive a request for information indicative of harmful substances and radiation in the work environment of the first worker 10-1. In some cases, the second worker 10-2 may need details of one or more physiological parameters of the first worker 10-1 wearing the first article of PPE 100-1. Therefore, based on the pull communication protocol, the second worker 10-2 can demand or request a desirable information related to the first worker 10-1. Upon receiving the required information based on the pull communication protocol, the second worker 10-2 may proceed with preventive measures to protect himself/herself as well as the first worker 10-1.

With reference to FIGS. 3, 5, and 6, the first processor 206-1 is configured to transmit the one or more messages directly to the second article of PPE 100-2 based on at least one of the push communication protocol, the pull communication protocol, and the continuous communication protocol. For each of the push communication protocol, the pull communication protocol, and the continuous communication protocol, any relevant information in the one or more first messages 208-1 can be transmitted directly from the first article of PPE 100-1 to the second article of PPE 100-2. In some cases, any relevant information in the one or more second messages 208-2 can be transmitted directly from the second article of PPE 100-2 to the first article of PPE 100-1.

In the PPE system 200, the first signals 204 generated by the at least one sensor 202 of the first article of PPE 100-1 and the direct transmission of the one or more first messages 208-1 to the second article of PPE 100-2 may enable the second worker 10-2 to determine a condition of the first worker 10-1 and his/her work environment in a lower time period as compared to conventional techniques of communication between the two workers in a hazardous environment. Further, the PPE system 200 do not involve removal of the first article of PPE 100-1 for determining and transmitting any information related to the first worker 10-1 and his/her work environment, and may therefore provide a time saving communication process between the first worker 10-1 and the second worker 10-2. Moreover, while determining the one or more first messages 208-1 and further transmitting them to the second article of PPE 100-2, there is a minimal possibility of an occurrence of a dangerous event that could otherwise happen in the conventional method comprising the removal of the first article of PPE 100-1 to determine the condition of the first worker 10-1. Therefore, the PPE system 200 including the first processor 206-1 in the first article of PPE 100-1 and the second processor 206-2 in the second article of PPE 100-2 may provide an efficient and time-saving method of communication between the first worker 10-1 and the second worker 10-2.

In some cases, the one or more first messages 208-1 received by the second article of PPE 100-2 of the second worker 10-2 may contain information that is important for his/her own safety. In an example, work environments of the first worker 10-1 and the second worker 10-2 may be in close proximity to each other. In case of an accident and/or an environmental hazard in the work environment of the first worker 10-1, the second worker 10-2 may receive an early update about such accidents/events that may otherwise later put the second worker 10-2 in a difficult and risky situation.

In some embodiments, the first processor 206-1 is further configured to prioritize the transmission of the one or more first messages 208-1 to the second article of PPE 100-2 based on the push communication protocol (communication with reference to FIG. 5) over the transmission of the one or more first messages 208-1 based on the pull communication protocol (communication with reference to FIG. 6). The one or more first messages 208-1 that are intended to be transmitted based on the push communication protocol include only the information pertaining to an emergency or a critical event associated with the first worker 10-1. However, the one or more first messages 208-1 that are intended to be transmitted based on the pull communication protocol may or may not include the information pertaining to an emergency or a critical event associated with the first worker 10-1. Therefore, due to transmission of only critical information based on the push communication protocol, the first processor 206-1 prioritizes the transmission of the one or more first messages 208-1 to the second article of PPE 100-2 based on the push communication protocol (communication with reference to FIG. 5) over the transmission of the one or more first messages 208-1 based on the pull communication protocol (communication with reference to FIG. 6).

FIG. 7 is a schematic block diagram of the PPE system 200 of FIG. 3, in accordance with another embodiment of the present disclosure. In some embodiments, the first processor 206-1 is configured to receive one or more external messages 218 directly from the second article of PPE 100-2 based on the continuous communication protocol (described with reference to FIG. 3). The one or more external messages 218 may be determined by the second processor 206-2 corresponding to the second signals 204-2 received from the at least one sensor 202 of the second article of PPE 100-2. The connection corresponding to the continuous communication protocol allows the second processor 206-2 of the second article of PPE 100-2 to continuously transmit the one or more external messages 218 directly to the first article of PPE 100-1.

The first processor 206-1 is further configured to determine a critical event associated with the second worker 10-2 based on the one or more external messages 218. In some cases, the critical event may be an event related to abnormal hemodynamic health status of the second worker 10-2, physiological abnormalities associated with the second worker 10-2, an accident in close proximity of the second worker 10-2, a sudden fall of the second worker 10-2, an environmental hazard in close proximity of the second worker 10-2, an unconscious state of the second worker 10-2, an injury sustained by the second worker 10-2, an impending safety event in close proximity of the second worker 10-2, and so on.

The first processor 206-1 is further configured to transmit a request 220 to the second article of PPE 100-2 for critical data 222 upon determining the critical event associated with the second worker 10-2. The request 220 is received by the second processor 206-2. Upon receiving the request 220, the second processor 206-2 transmits the critical data 222 determined by the second processor 206-2 to the first article of PPE 100-1. In other words, the first processor 206-1 is further configured to receive the critical data 222 from the second article of PPE 100-2 based on the pull communication protocol (described with reference to FIG. 6). Based on the pull communication protocol, the second processor 206-2 is configured to transmit a given information to the first article of PPE 100-1 upon receiving a request for the given information from the first article of PPE 100-1.

In some embodiments, the critical data 222 includes information related to at least one of an abnormal hemodynamic health status of second worker 10-2, an abnormal physiological data of the second worker 10-2, an accident in close proximity of the second worker 10-2, an unconscious state of the second worker 10-2, an injury sustained by the second worker 10-2, and an alert indicative of an environmental hazard in close proximity to the second worker 10-2.

Once the first article of PPE 100-1 of the first worker 10-1 receives the critical data 222 indicative of the critical event related to the second worker 10-2, the first worker 10-1 may take any preventive measures or share the critical data 222 with a central server, or other team members, or a concerned medical professional to protect and/or alert the second worker 10-2 from any kind of risk. In some cases, the second worker 10-2 may be unaware of a poor air quality of his/her work environment and an upcoming hazardous event due to poor air quality. In such cases, the first article of PPE 100-1 would receive the critical data 222 comprising information indicative of poor air quality of the work environment of the second worker 10-2. The first worker 10-1 may take preventive measures to protect and/or alert the second worker 10-2 from contaminated air. In some cases, where the second worker 10-2 is exposed to a dangerous condition, the second processor 206-2 transmits the critical data 222 indicative of the dangerous condition to the first article of PPE 100-1. In some cases, where the second worker 10-2 may be rendered unconscious and cannot contact the team members to inform his/her condition, the second processor 206-2 transmits the critical data 222 indicative of the unconscious condition of the second worker 10-2 to the first article of PPE 100-1. Upon receiving the critical data 222 from the second article of PPE 100-2, a supportive and preventive action may be initiated by the first worker 10-1.

Figure 8:
FIG. 8 is a schematic block diagram of the PPE system of FIG. 3, according to another embodiment of the present disclosure.

FIG. 8 is a schematic block diagram of the PPE system 200 of FIG. 3, in accordance with another embodiment of the present disclosure. In some embodiments, the first article of PPE 100-1 further includes a digital stethoscope 224 communicably coupled to the first processor 206-1. Typically, a digital stethoscope or an electronic stethoscope is able to convert acoustic sound waves obtained through a chest piece into electrical signals which can then be amplified for optimal listening. The converted electrical signals can also be digitalized for further processing and transmission. The signal can then be displayed as a phonocardiogram on an electronic device. It allows a physician to record heart sounds of their patients directly onto his/her laptop for further visualization and analysis. The first article of PPE 100-1 further includes an output unit 230 for displaying or outputting various information, for example, phonocardiogram based on data obtained from the digital stethoscope, information based on signals received from the at least one sensor 202, and so forth.

In the illustrated embodiment of FIG. 8, the first processor 206-1 is further configured to receive acoustic data 226 from the second article of PPE 100-2. The acoustic data 226 may be determined by a chest piece (not shown) attached to the chest of the second worker 10-2 and communicably coupled to the second processor 206-2 of the second article of PPE 100-2. As the chest piece would be communicably coupled to the second processor 206-2, the second processor 206-2 is configured to transmit the acoustic data 226 to the first processor 206-1, or the first processor 206-1 is configured to receive the acoustic data 226 from the second article of PPE 100-2. The second processor 206-2 may store the acoustic data 226 in the second memory 210-2.

Upon receiving the acoustic data 226 from the second article of PPE 100-2, the first processor 206-1 is configured to transmit the acoustic data 226 to the digital stethoscope 224. The digital stethoscope 224 is configured to generate auscultation data 228 based on the acoustic data 226 received from the first processor 206-1. The first processor 206-1 may store the auscultation data 228 in the first memory 210-1.

The digital stethoscope 224 may include various components, such as a microphone, a piezoelectric sensor, a pre-amplifier, an anti-aliasing circuit, an adaptive noise canceller, analog to digital converter, data normalizer, and so on, to generate the auscultation data 228. The auscultation data 228 may be used for the purposes of examining circulatory system and respiratory system (heart sounds and breath sounds), as well as gastrointestinal system (bowel sounds) of the second worker 10-2 wearing the second article of PPE 100-2. In case of any abnormality in the auscultation data 228, the first worker 10-1 may initiate a preventive action to protect or alert the second worker 10-2.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An article of personal protective equipment (PPE) associated with a first worker present in a work environment, comprising:

at least one first sensor configured to generate signals indicative of a sensed variable related to at least one of the first worker and the work environment; and a processor communicably coupled to the at least one first sensor and at least one other second article of PPE associated with one other second worker, wherein the processor is configured to:

receive the signals from the at least one first sensor;

determine one or more messages corresponding to the signals;

transmit the one or more messages directly to the at least one other second article of PPE;

receive one or more external messages directly from the at least one other second article of PPE based on at least one of a push communication protocol, a pull communication protocol, and a continuous communication protocol;

determine a critical event based on the one or more external messages;

transmit a request to the at least one other second article of PPE for critical data upon determining the critical event; and receive the critical data from the at least one other second article of PPE based on the pull communication protocol.

2. The article of PPE of claim 1, wherein the one or more messages comprise information related to at least one of an air quality of the work environment of the first worker, a temperature of the work environment, a pressure of the work environment, a radiation in the work environment, a noise level in the work environment, a humidity of the work environment, a concentration of harmful substances, a physiological data of the first worker, a hemodynamic health status of the first worker, and a physical state of the first worker.

3. The article of PPE of claim 1, wherein the at least one first sensor comprises at least one of a physiological sensor, a thermal imaging camera, a video camera, a gas detector, a temperature sensor, a humidity sensor, an accelerometer, a magnetometer, an altimeter, an environmental sensor, and a sighting device.

4. The article of PPE of claim 1, wherein the one or more messages comprise at least one of an audio-visual signal, a haptic alert signal, a still image, a pictograph, a symbol, digital data, a slow-motion video, and a live video feed.

5. The article of PPE of claim 1, wherein the processor is communicably coupled to the at least one other second article of PPE via at least one of a wired connection and a wireless connection.

6. The article of PPE of claim 1, comprising one of a respiratory protective equipment (RPE), a self-contained breathing apparatus (SCBA), a powered air purifying respirator (PAPR), a supplied air respirator (SAR), a pressure-demand supplied air respirator (PDSAR), a face shield, a safety goggle, and a hearing aid.

7. The article of PPE of claim 1, wherein the critical data comprises information related to at least one of an abnormal hemodynamic health status of the one other second worker, an abnormal physiological data of the one other second worker, an accident in close proximity of the one other second worker, an unconscious state of the one other second worker, an injury sustained by the one other second worker, and an alert indicative of an environmental hazard in close proximity to the one other second worker.

8. The article of PPE of claim 1, further comprising a digital stethoscope communicably coupled to the processor, wherein the processor is further configured to: receive acoustic data from the at least one other second article of PPE; and transmit the acoustic data to the digital stethoscope; wherein the digital stethoscope is configured to generate auscultation data based on the acoustic data received from the processor.

9. The article of PPE of claim 1, wherein the processor is further configured to: determine a second critical event based on the signals received from the at least one first sensor; determine second critical data based on the second critical event; and transmit the second critical data directly to the at least one other second article of PPE based on the push communication protocol upon determining the second critical event.

10. The article of PPE of claim 9, wherein the critical data comprises information related to at least one of an abnormal hemodynamic health status of the worker, an abnormal physiological data of the worker, an accident in close proximity of the worker, an unconscious state of the worker, an injury sustained by the worker, and an alert indicative of an environmental hazard in close proximity to the worker.

11. The article of PPE of claim 1, wherein the processor is configured to continuously transmit the one or more messages directly to the at least one other second article of PPE based on the continuous communication protocol when a distance between the article of PPE and the at least one other second article of PPE is equal to or less than a predefined distance, and to suspend the continuous transmission when the distance is greater than the predefined distance.

12. The article of PPE of claim 1, wherein the processor is configured to be automatically communicably coupled to the at least one other second article of PPE when the article of PPE and the at least one other second article of PPE are in close proximity to each other for a first time.

13. A personal protective equipment (PPE) system comprising:

a plurality of articles of PPE associated with corresponding workers present in a work environment, at least one article of PPE from the plurality of articles of PPE comprising:

at least one sensor configured to generate signals indicative of a sensed variable related to at least one of the corresponding worker and the work environment; and a processor communicably coupled to the at least one sensor and to at least one other article of PPE from the plurality of articles of PPE, wherein the processor is configured to:

receive the signals from the at least one sensor;

determine one or more messages corresponding to the signals;

transmit the one or more messages directly to the at least one other article of PPE based on at least one of a group consisting of: a push communication protocol, a pull communication protocol, and a continuous communication protocol;

receive one or more external messages directly from the at least one other article of PPE based on the continuous communication protocol;

determine a critical event based on the one or more external messages;

transmit a request to the at least one other article of PPE for critical data upon determining the critical event; and receive the critical data from the at least one other article of PPE based on the pull communication protocol.

14. The PPE system of claim 13, wherein the at least one article of PPE comprises one of a respiratory protective equipment (RPE), a self-contained breathing apparatus (SCBA), a powered air purifying respirator (PAPR), a supplied air respirator (SAR), a pressure-demand supplied air respirator (PDSAR), a face shield, a safety goggle, and a hearing aid.

15. The PPE system of claim 13, wherein the at least one article of PPE further comprises a digital stethoscope communicably coupled to the processor, wherein the processor is further configured to:

receive acoustic data from the at least one other article of PPE; and transmit the acoustic data to the digital stethoscope;

wherein the digital stethoscope is configured to generate auscultation data based on the acoustic data received from the processor.

16. The PPE system of claim 13, wherein the processor is further configured to: determine a second critical event based on the signals received from the at least one sensor; determine second critical data based on the second critical event; and transmit the second critical data directly to the at least one other article of PPE based on the push communication protocol upon determining the second critical event.

* * * * *